US010397954B2

(12) United States Patent
Kim et al.

(10) Patent No.: US 10,397,954 B2
(45) Date of Patent: Aug. 27, 2019

(54) METHOD FOR PERFORMING BACKOFF IN WIRELESS CONNECTION SYSTEM THAT SUPPORTS UNLICENSED BANDS, AND APPARATUS SUPPORTING SAME

(71) Applicant: LG ELECTRONICS INC., Seoul (KR)

(72) Inventors: Seonwook Kim, Seoul (KR); Joonkui Ahn, Seoul (KR); Kijun Kim, Seoul (KR); Hanbyul Seo, Seoul (KR); Hyukjin Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 89 days.

(21) Appl. No.: 15/524,819

(22) PCT Filed: Nov. 6, 2015

(86) PCT No.: PCT/KR2015/011898
§ 371 (c)(1),
(2) Date: May 5, 2017

(87) PCT Pub. No.: WO2016/072788
PCT Pub. Date: May 12, 2016

(65) Prior Publication Data

US 2017/0339720 A1 Nov. 23, 2017

Related U.S. Application Data

(60) Provisional application No. 62/075,912, filed on Nov. 6, 2014, provisional application No. 62/105,755, filed on Jan. 21, 2015.

(51) Int. Cl.

| | |
|---|---|
| ***H04L 5/00*** | (2006.01) |
| ***H04L 27/00*** | (2006.01) |
| ***H04W 16/14*** | (2009.01) |
| ***H04W 74/08*** | (2009.01) |
| ***H04W 88/08*** | (2009.01) |

(52) U.S. Cl.
CPC ..... *H04W 74/0808* (2013.01); *H04L 27/0006* (2013.01); *H04W 16/14* (2013.01); *H04L 5/001* (2013.01); *H04W 88/08* (2013.01)

(58) Field of Classification Search
CPC . H04W 74/0808; H04W 16/14; H04W 88/08; H04W 74/08; H04W 74/0816;
(Continued)

(56) References Cited

U.S. PATENT DOCUMENTS

2011/0069628 A1* 3/2011 Liu .................. H04W 74/0816 370/252
2013/0329711 A1* 12/2013 Seo ..................... H04J 11/0069 370/336

(Continued)

FOREIGN PATENT DOCUMENTS

WO WO 2013/115629 A1 8/2013
WO WO 2013/141669 A1 9/2013

(Continued)

*Primary Examiner* — Ian N Moore
*Assistant Examiner* — Brian T Le
(74) *Attorney, Agent, or Firm* — Birch, Stewart, Kolasch & Birch, LLP

(57) ABSTRACT

The present invention relates to a wireless connection system that supports unlicensed bands. A method for performing backoff, methods for configuring a reservation signal transmission and a transmission opportunity section, and apparatus supporting the same. A method for performing a backoff operation in a wireless connection system supporting unlicensed bands, that is an embodiment of the present invention, may comprises the steps of: configuring a backoff counter N so as to perform a backoff operation; determining whether a current sub-frame is a back-off permitted section; performing a carrier sensing (CS) operation for checking if an unlicensed band is in an idle state if the sub-frame is within a backoff permitted section, for each CS unit; decreasing the backoff counter N by 1 after performing the (Continued)

CS operation; and transmitting a reservation signal or data using a U cell that is formed in an unlicensed band if the backoff counter value expires. In this regard, the CS operation is not performed in sub-frames except for the backoff permitted section and the backoff counter value can be maintained continuously.

12 Claims, 17 Drawing Sheets

(58) Field of Classification Search
CPC ........... H04W 74/0825; H04W 72/042; H04W 72/0453; H04L 27/0006; H04L 5/001; H04L 5/0007
See application file for complete search history.

(56) References Cited

U.S. PATENT DOCUMENTS

| | | | | |
|---|---|---|---|---|
| 2014/0036853 A1* | 2/2014 | Kim | ...................... | H04W 16/14 370/329 |
| 2015/0085849 A1* | 3/2015 | Kim | ...................... | H04W 24/02 370/338 |

FOREIGN PATENT DOCUMENTS

| | | |
|---|---|---|
| WO | WO 2013/154401 A1 | 10/2013 |
| WO | WO 2013-169072 A1 | 11/2013 |

* cited by examiner ( b ) Multiple CC ( a ) Single CC (a)

(b)

(a)

(b)

METHOD FOR PERFORMING BACKOFF IN WIRELESS CONNECTION SYSTEM THAT SUPPORTS UNLICENSED BANDS, AND APPARATUS SUPPORTING SAME

CROSS REFERENCE TO RELATED APPLICATIONS

This application is the National Phase of PCT International Application No. PCT/KR2015/011898, filed on Nov. 6, 2015, which claims priority under 35 U.S.C. 119(e) to U.S. Provisional Application No. 62/075,912, filed on Nov. 6, 2014 and 62/105,755 filed on Jan. 21, 2015, all of which are hereby expressly incorporated by reference into the present application.

TECHNICAL FIELD

The present invention relates to a wireless access system supporting an unlicensed band, and more particularly, to a method of performing backoff, methods of configuring a reservation signal transmission and a transmission opportunity section, and apparatuses supporting the same.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency-division multiple access (SC-FDMA) system.

DISCLOSURE OF THE INVENTION

Technical Tasks

The present invention relates to a wireless access system supporting an unlicensed band, and more particularly, to a method of performing backoff, methods of configuring a reservation signal transmission and a transmission opportunity section, and apparatuses supporting the same.

An object of the present invention is to provide a method of efficiently transmitting and receiving data in a wireless access system supporting an unlicensed band and a licensed band.

Another object of the present invention is to provide a method of adaptively performing a backoff operation in consideration of a channel state of a unlicensed band.

Another object of the present invention is to provide a method of transmitting and receiving a reservation signal for securing a transmission opportunity section.

Another object of the present invention is to provide a method of configuring a transmission opportunity section.

The other object of the present invention is to provide apparatuses supporting the above mentioned methods.

Technical tasks obtainable from the present invention are non-limited the above-mentioned technical task. And, other unmentioned technical tasks can be clearly understood from the following description by those having ordinary skill in the technical field to which the present invention pertains.

Technical Solution

The present invention relates to a wireless access system supporting an unlicensed band, and more particularly, to a method of performing backoff, methods of configuring a reservation signal transmission and a transmission opportunity section, and apparatuses supporting the same.

To achieve these and other advantages and in accordance with the purpose of the present invention, as embodied and broadly described, according to one embodiment, a method of performing a backoff operation in a wireless access system supporting an unlicensed band, includes the steps of configuring a backoff counter N for performing the backoff operation, determining whether or not a current subframe corresponds to a back-off permitted duration, if the subframe belongs to the backoff permitted duration, performing a carrier sensing (CS) operation in a CS unit to check whether or not the unlicensed band is in an idle state, decreasing the backoff counter N by 1 after the CS operation is performed, and if the backoff counter value is expired, transmitting a reservation signal or data via a Ucell configured on the unlicensed band. In this case, the backoff counter value can be consistently maintained in subframes except the backoff permitted duration without performing the CS operation.

To further achieve these and other advantages and in accordance with the purpose of the present invention, according to a different embodiment, an eNB performing a backoff operation in a wireless access system supporting an unlicensed band includes a transmitter, a receiver, and a processor configured to control the transmitter and the receiver to perform the backoff operation, the processor configured to set a backoff counter N for performing the backoff operation, the processor configured to determine whether or not a current subframe corresponds to a backoff permitted duration, if the subframe belongs to the backoff permitted duration, the processor configured to control at least one of the transmitter and the receiver to perform a carrier sensing (CS) operation in a CS unit to check whether or not the unlicensed band is in an idle state, the processor configured to decrease the backoff counter N by 1 after the CS operation is performed, if the backoff counter value is expired, the processor configured to control the transmitter to transmit a reservation signal or data via a Ucell configured on the unlicensed band. In this case, the backoff counter value can be consistently maintained in subframes except the backoff permitted duration without performing the CS operation.

The backoff counter value may correspond to a fixed value configured in a system or a value dynamically or semi-statically configured via a Pcell configured on a licensed band.

A boundary of the CS unit at which the CS operation is performed can be configured to be matched with a boundary of an OFDM symbol of a Pcell configured on a licensed band in the embodiments of the present invention.

In this case, if there is remaining time duration due to a size of the CS unit smaller than a size of the OFDM symbol, the CS operation can be configured not to be performed during the remaining time duration.

Alternately, if there is remaining time duration due to a size of the CS unit smaller than a size of the OFDM symbol, the remaining time duration can be configured from a start boundary of the OFDM symbol and the CS operation can be configured not to be performed during the remaining time duration.

A length of transmission opportunity duration (TxOP) for transmitting the data can be configured in proportion to a length of the reservation signal.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, it is able to efficiently transmit and receive data in a wireless access system supporting an unlicensed band and a licensed band.

Second, it is able to adaptively perform a backoff operation in consideration of a channel state of an unlicensed band.

Third, it is able to secure a channel equal to or greater than a prescribed level for an unlicensed band system operating on an unlicensed band by performing a backoff operation according to the present invention.

Fourth, it is able to constantly maintain overhead according to a reservation signal transmission by configuring a size of a transmission opportunity section in proportion to a length of transmitting a reservation signal.

Effects obtainable from the present invention may be non-limited by the above mentioned effect. And, other unmentioned effects can be clearly understood from the following description by those having ordinary skill in the technical field to which the present invention pertains. In particular, when the present invention is implemented, unintended effects can also be deducted from the embodiments of the present invention by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

BEST MODE

Mode for Invention

Figure 1:
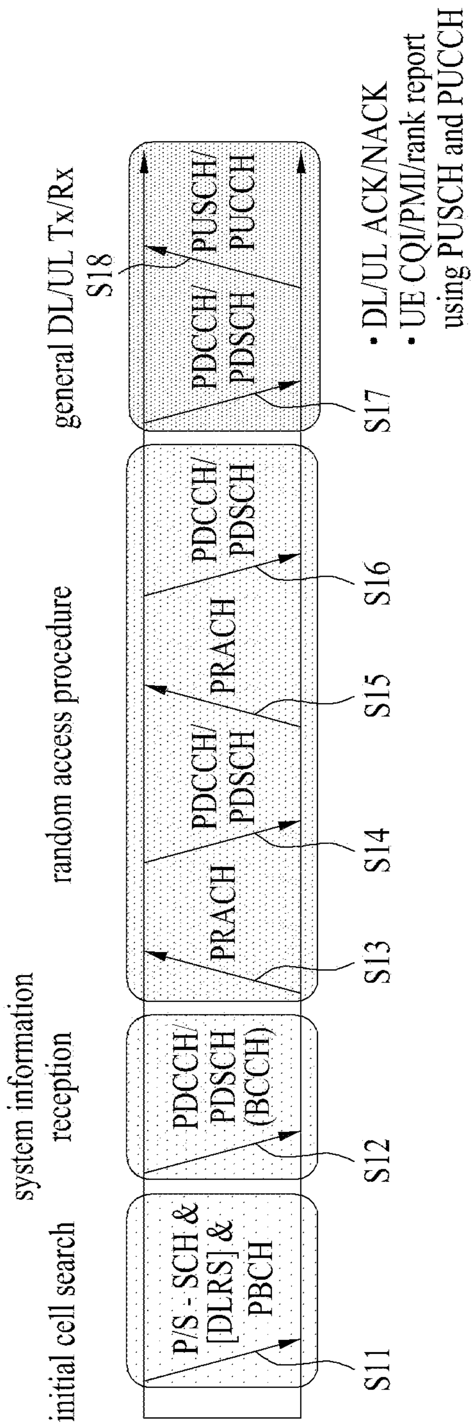
FIG. 1 is a diagram illustrating physical channels and a signal transmission method using the physical channels.

The present invention relates to a wireless access system supporting an unlicensed band. A method of performing backoff, methods of configuring a reservation signal transmission and a transmission opportunity section, and apparatuses supporting the methods are proposed in the present invention.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context dearly indicates otherwise.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point".

In the embodiments of the present disclosure, the term terminal may be replaced with a User Equipment (UE), a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an Uplink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a Transmission Opportunity Period (TxOP) is interchangeable with a Reserved Resource Period (RRP) in the same meaning. In addition, a Listen Before Talk (LBT) process and a carrier sensing (CS) process for determining whether a channel state is in an idle state can be performed for the same purpose.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE), OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 801.16e/m system, etc.

1.3 GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the type/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs an initial cell search operation such as synchronization with an eNB (S11). To this end, the UE may receive a primary synchronization channel (P-SCH) and a secondary synchronization channel (S-SCH) from the eNB to perform synchronization with the eNB and acquire information such as a cell ID.

Then, the UE may receive a physical broadcast channel from the eNB to acquire broadcast information in the cell.

During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive PDCCH/PDSCH from the eNB (S17) and may transmit a physical uplink shared channel (PUSCH)/physical uplink control channel (PUCCH) to the eNB (S18), which is a general uplink/downlink signal transmission procedure.

Control information that the UE transmits to the eNB is commonly called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
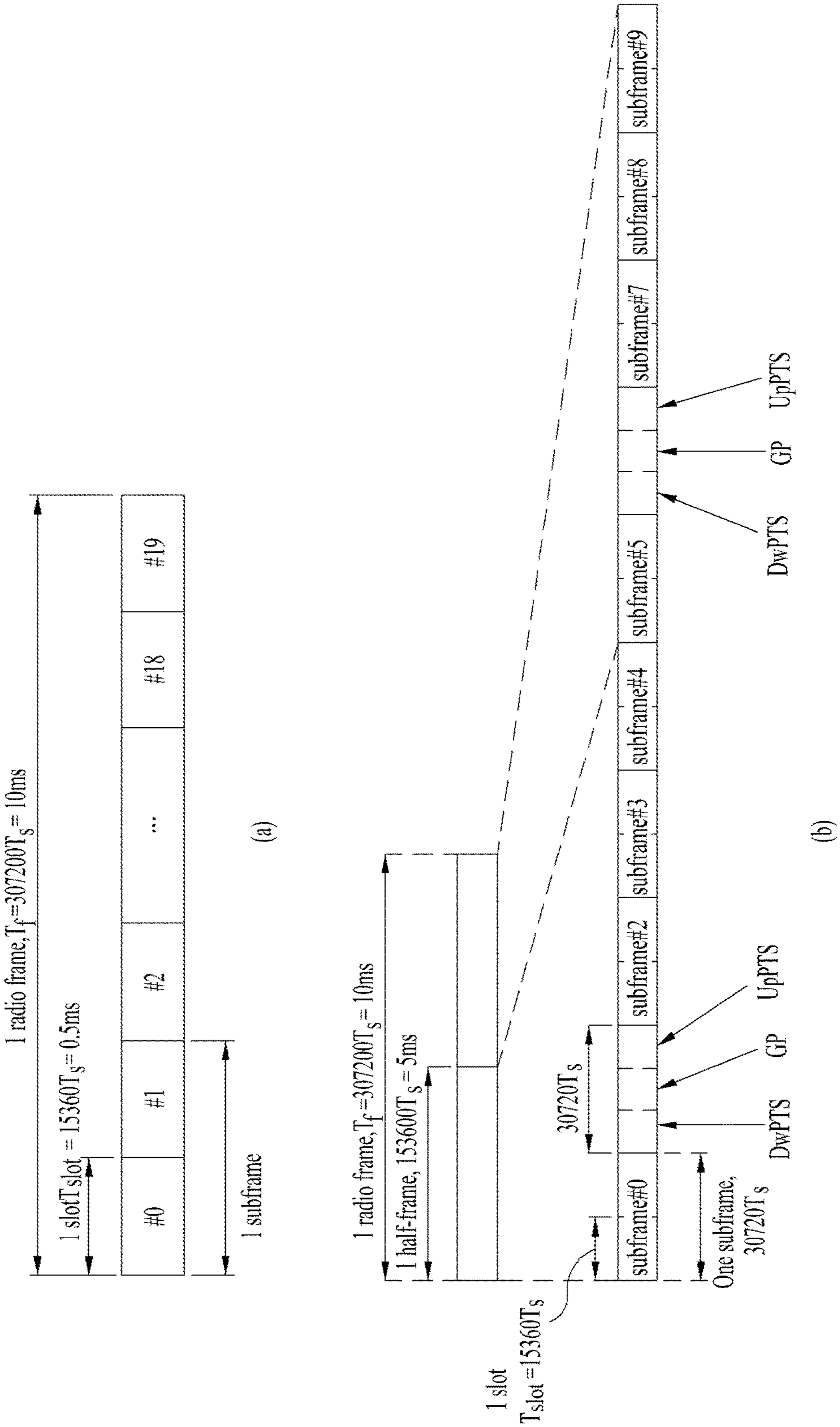
FIG. 2 is a diagram illustrating a structure of a radio frame.

FIG. 2 illustrates exemplary radio frame structures used in embodiments of the present disclosure.

FIG. 2(*a*) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(*b*) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
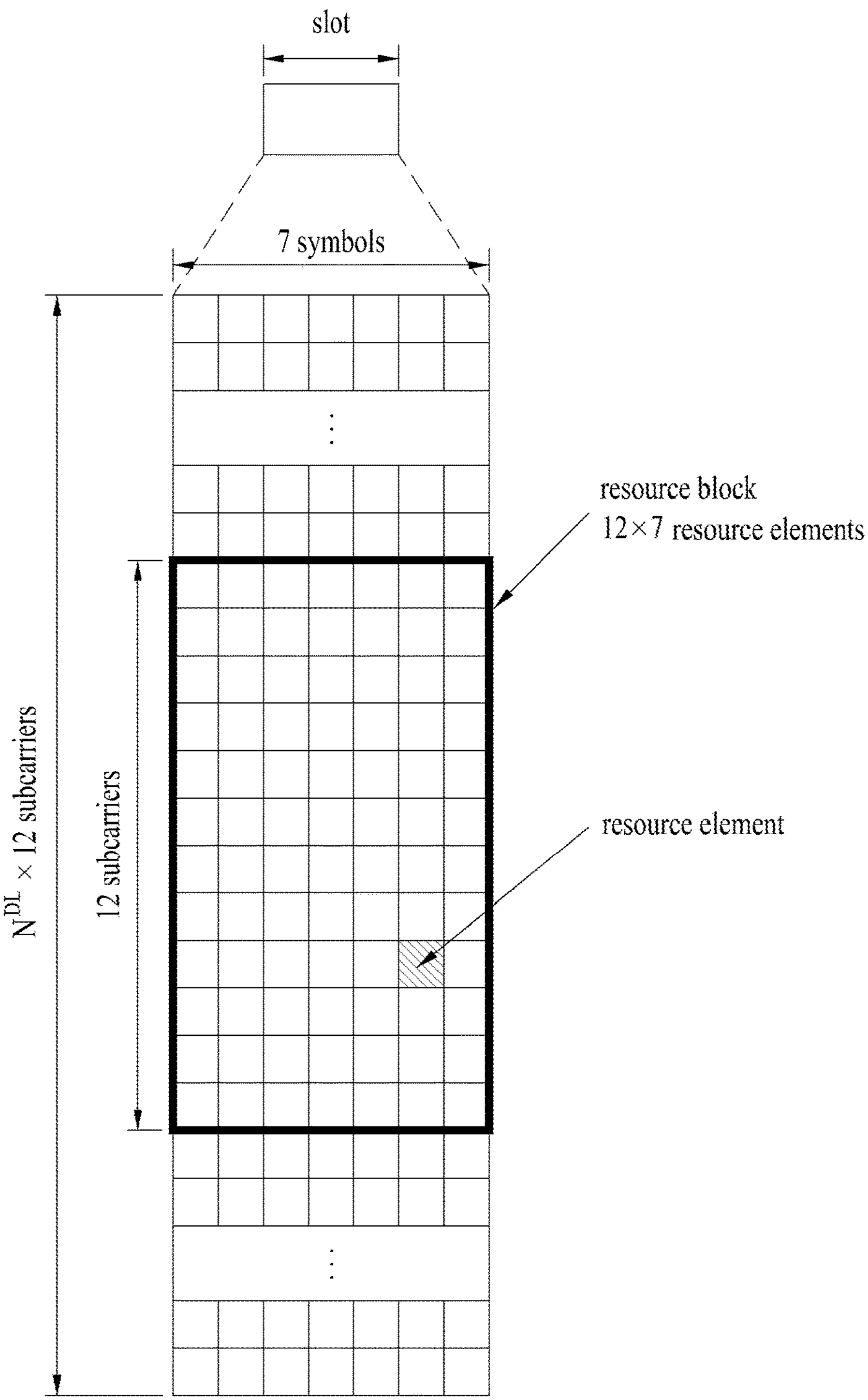
FIG. 3 is a diagram illustrating an example of a resource grid of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
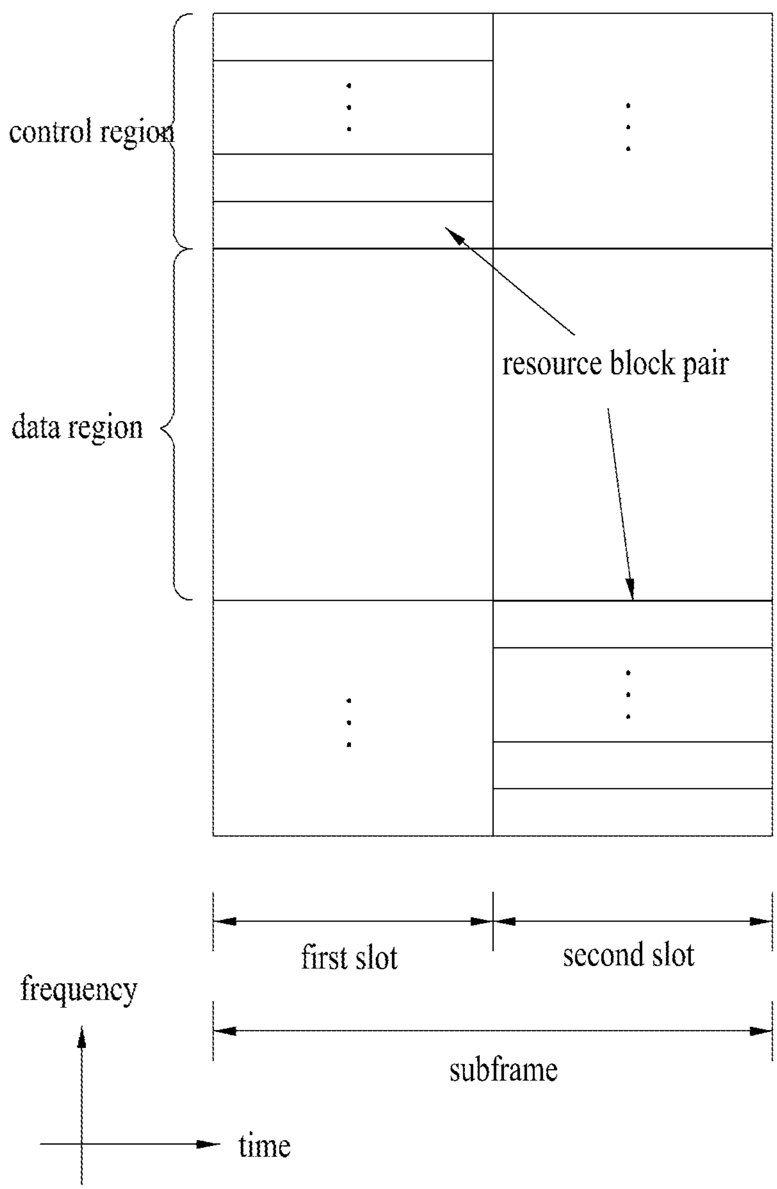
FIG. 4 is a diagram illustrating a structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
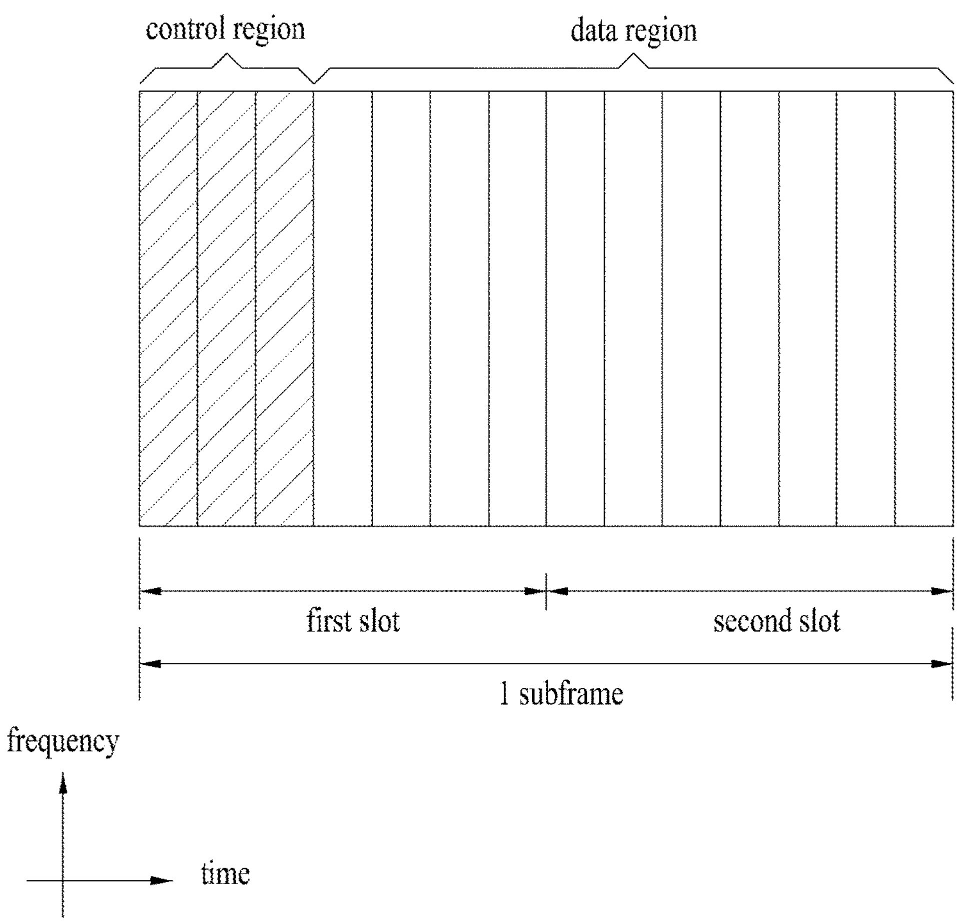
FIG. 5 is a diagram illustrating a structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants or the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);

(2) Transmission mode 2: Transmit diversity;

(3) Transmission mode 3: Open-loop spatial multiplexing;

(4) Transmission mode 4: Closed-loop spatial multiplexing;

(5) Transmission mode 5: MU-MIMO;

(6) Transmission mode 6: Closed-loop, rank-1 precoding;

(7) Transmission mode 7: Precoding supporting a single layer transmission, which is not based on a codebook;

(8) Transmission mode 8: Precoding supporting up to two layers, which are not based on a codebook;

(9) Transmission mode 9: Precoding supporting up to eight layers, which are not based on a codebook; and

(10) Transmission mode 10: Precoding supporting up to eight layers, which are not based on a codebook, used for CoMP.

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX)mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the CE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L\in\{1,2,4,8\}$. The CCEs of PDCCH candidate set m in the SS may be determined by the following equation.

$$L\cdot\{(Y_k+m)\bmod \lfloor N_{CCE,k}/L\rfloor\}+i \qquad \text{[Equation 1]}$$

where $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$. $k=\lfloor n_s/2\rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Search space $S_k^{(L)}$ | | | Number of |
|---|---|---|---|
| Type | Aggregation level L | Size [in CCEs] | PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A\cdot Y_{k-1})\bmod D \qquad \text{[Equation 2]}$$

where $Y_{-1}=n_{RNTI}\neq 0$, $n_{RNTI}$ indicating an RNTI value. A 39827 and D=65537.

2. Carrier Aggregation (CA) Environment 2.1 CA Overview

A 3GPP LTE (3rd Generation Partnership Project Long Term Evolution) system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for handover procedure by a higher-layer RRCConnectionReconfiguration message including mobility-ControlInfo to a UE supporting CA.

SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
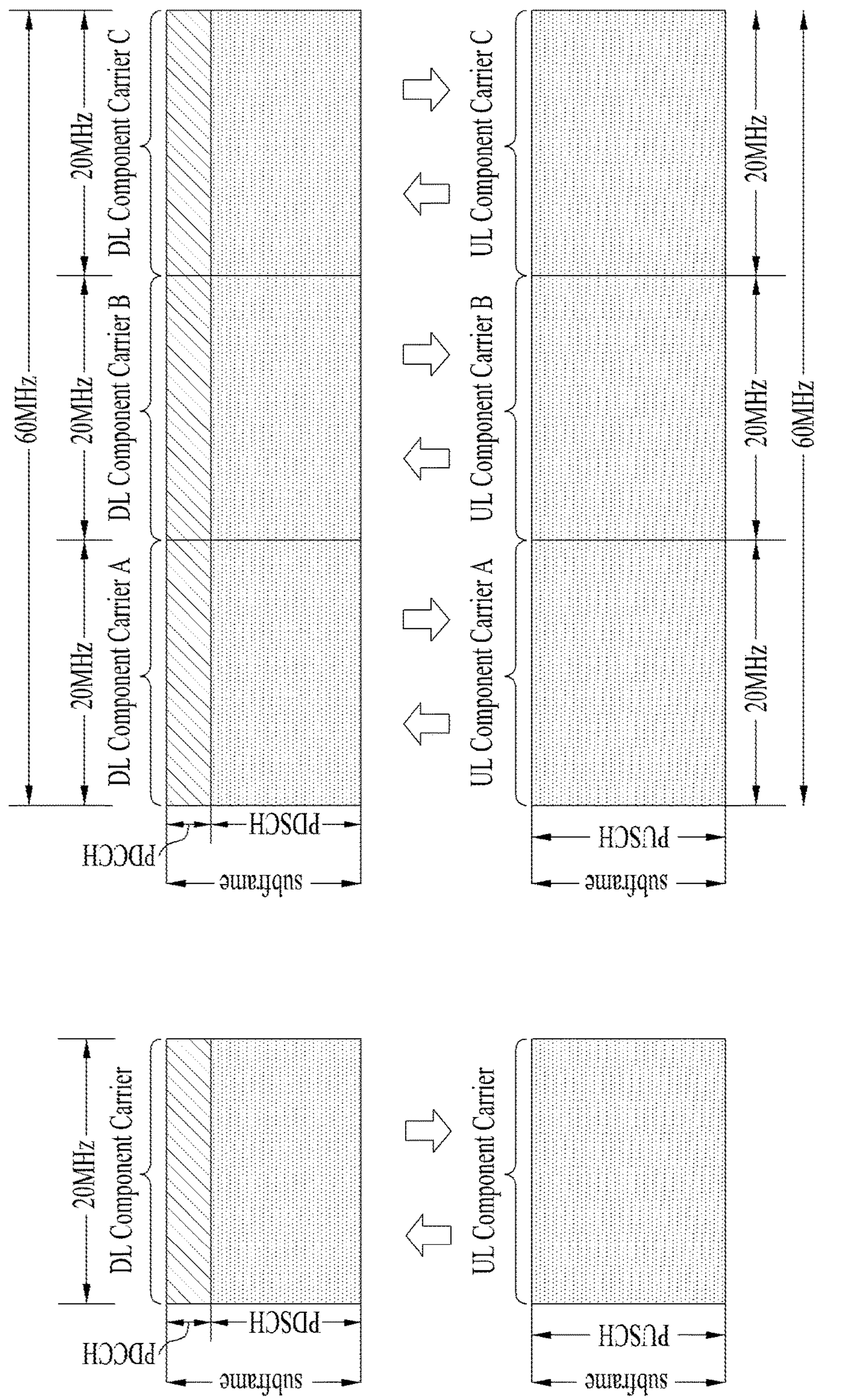
FIG. 6 is a diagram illustrating an example of a component carrier (CC) and carrier aggregation (CA) used in an LTE_A system.

FIG. 6 illustrates an example of CCs and CA in the LTE-A system, which are used in embodiments of the present disclosure.

FIG. 6(*a*) illustrates a single carrier structure in the LTE system. There are a DL CC and a UL CC and one CC may have a frequency range of 20 MHz.

FIG. 6(*b*) illustrates a CA structure in the LTE-A system. In the illustrated case of FIG. 6(*b*), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, linkage may refer to a mapping relationship between a DL CC carrying a PDCCH with a UL grant and a UL CC using the UL grant, or a mapping relationship between a DL CC (or a UL CC) carrying HARQ data and a CC (or at DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, PDCCH (carrying a DL gram) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
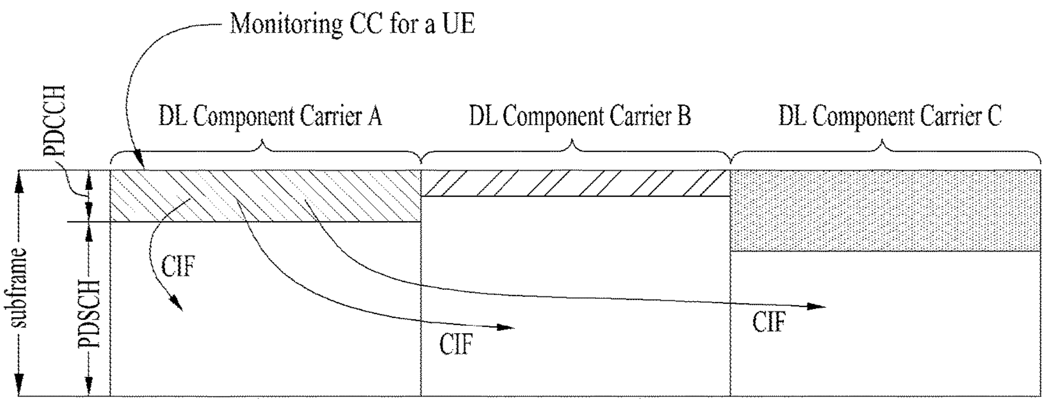
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher layer signaling, only DL CC 'A' may carry a PDCCH that schedules a PDSCH in the same DL CC 'A' or another CC. Herein, no PDCCH is transmitted its DL CC 'B' and DL CC that are not configured as PUCCH monitoring DL CCs.

Figure 8:
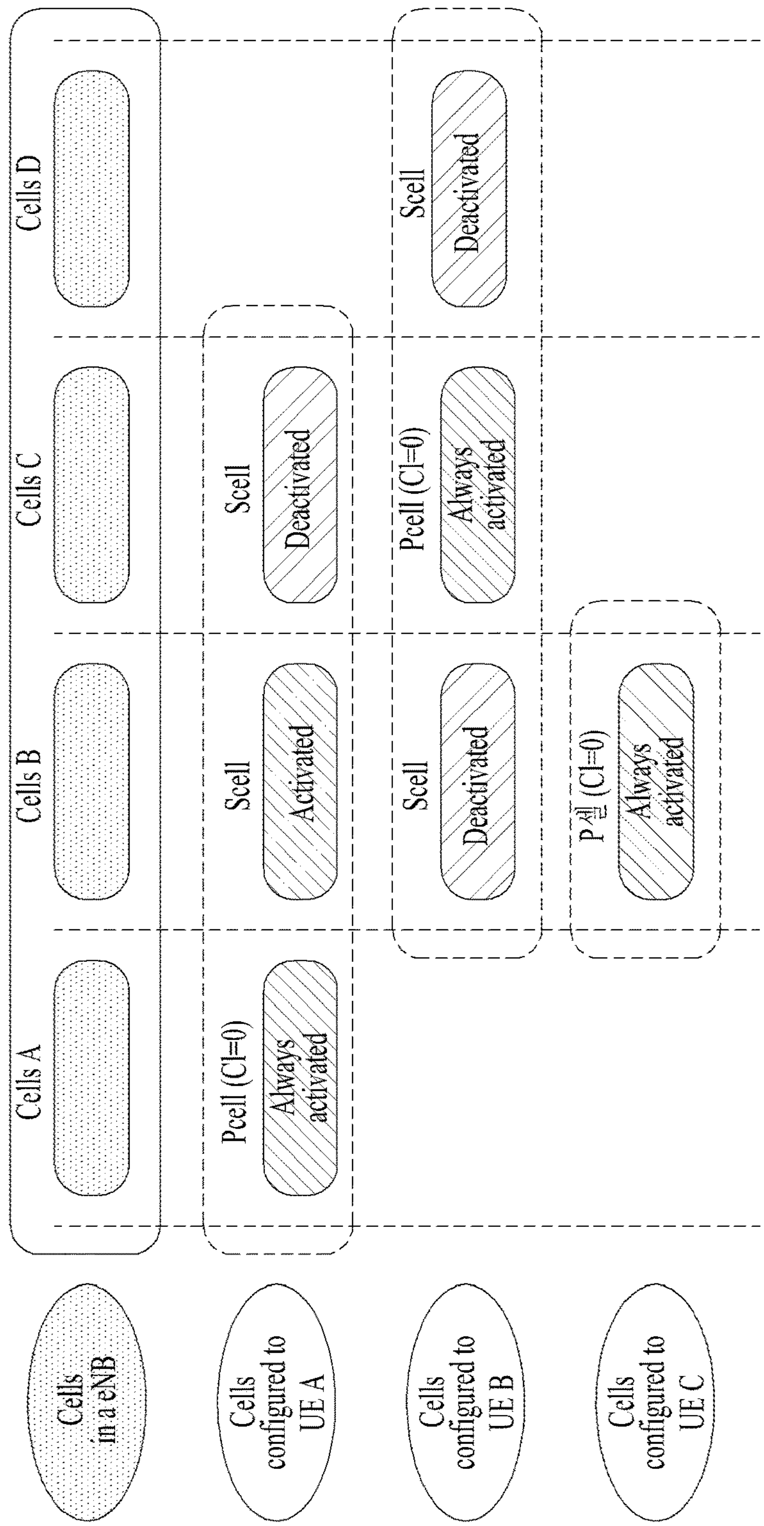
FIG. 8 is a conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of Pcell. In this case, Pcell is always activated, and Scell may be activated or deactivated by the eNB and/or UE.

The cells shown in FIG. 8 may be configured per UE. The above-mentioned cells selected from among cells of the eNB, cell addition may be applied to Carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment Based CoMP Operation

Hereinafter, a cooperation multi-point (CoMP) transmission operation applicable to the embodiments of the present invention will be described.

Figure 9:
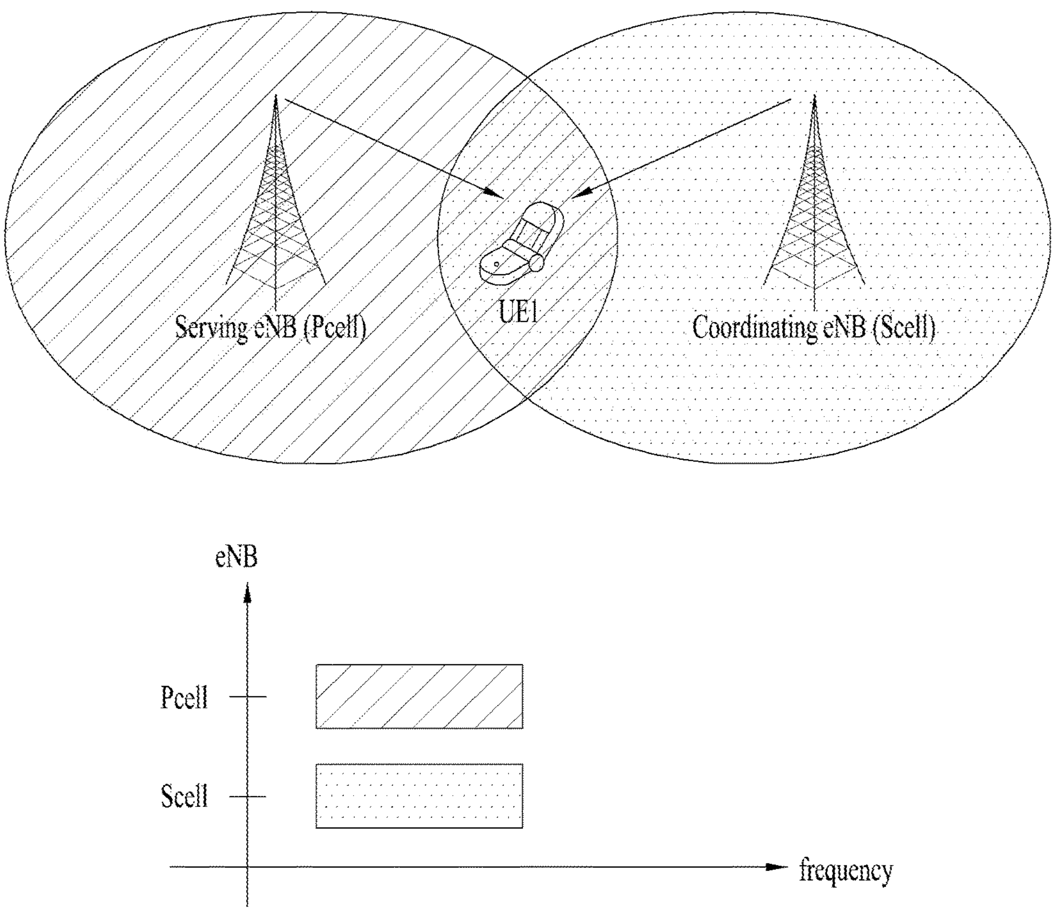
FIG. 9 illustrates one of methods for transmitting SRS used in the embodiments of the present invention.

In the LTE-A system, CoMP transmission may be implemented using a carrier aggregation (CA) function in the LTE. FIG. 9 is a conceptual view illustrating a CoMP system operated based on a CA environment.

In FIG. 9, it is assumed that a carrier operated as a Pcell and a carrier operated as an Scell may use the same frequency band on a frequency axis and are allocated to two eNBs geographically spaced apart from each other. At this time, a serving eNB of UE1 may be allocated to the Pcell, and a neighboring cell causing much interference may be allocated to the Scell. That is, the eNB of the Pcell and the eNB of the Scell may perform various UL/DL CoMP operations such as joint transmission (JT), CS/CB and dynamic cell selection for one UE.

FIG. 9 illustrates an example that cells managed by two eNBs are aggregated as Pcell and Scell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the Pcell does not always need to participate in CoMP operation.

2.4 Reference Signal (RS)

Hereinafter, reference signals that can be used in the embodiments of the present invention will be described.

Figure 10:
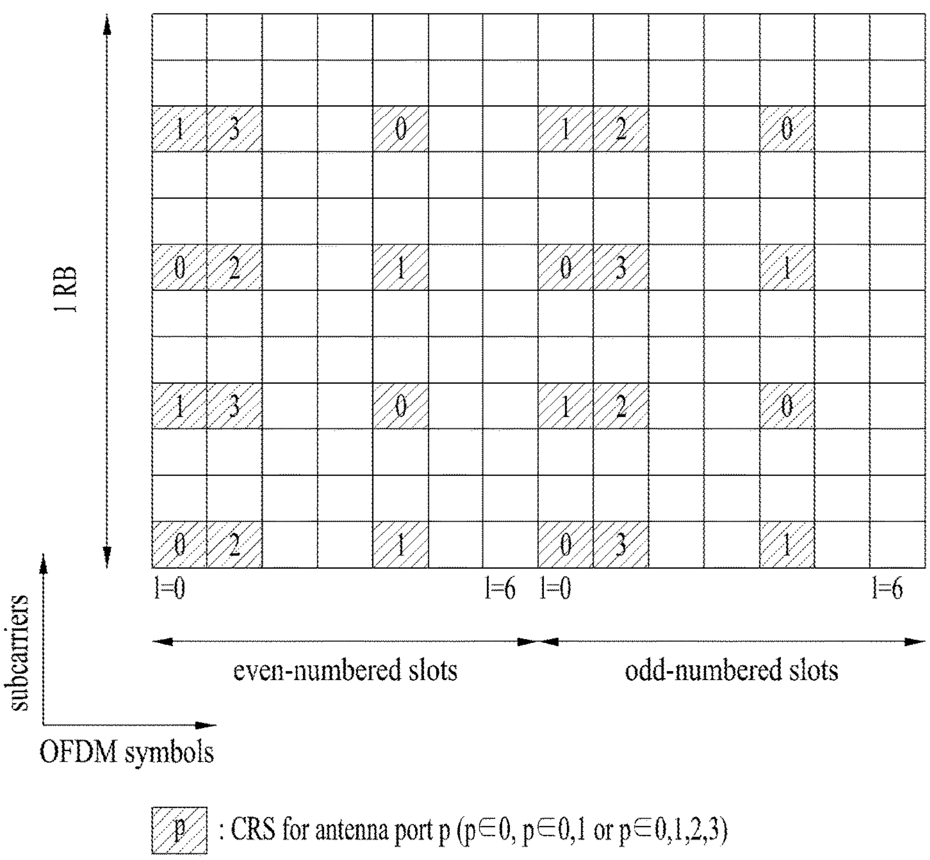
FIG. 10 illustrates an example of a subframe to which a cell specific reference signal (CRS) capable of being used in the embodiments of the present invention is allocated.

FIG. 10 illustrates an example of a subframe to which a cell specific reference signal (CRS) that can be used in the embodiments of the present invention is allocated.

FIG. 10 illustrates an allocation structure of a CRS if four antennas are supported in a wireless access system. In a 3GPP LTE/LTE-A system, the CRS is used for decoding and channel state measurement. Therefore, the CRS is transmitted to all downlink bandwidths at all downlink subframes within a cell supporting PDSCH transmission, and is transmitted from all antenna ports configured in an eNB.

In more detail, CRS sequence is mapped to complex-valued modulation symbols used as reference symbols for an antenna port p at a slot $n_s$.

A UE may measure CSI by using the CRS, and may decode a downlink data signal received through a PDSCH at a subframe including the CRS, by using the CRS. That is, the eNB transmits the CRS from all RBs to a certain position within each RB, and the UE detects a PDSCH after performing channel estimation based on the CRS. For example, the UE measures a signal received at a CRS RE. The UE may detect a PDSCH signal from RE to which PDSCH is mapped, by using a ratio of receiving energy per CRS RE and a receiving energy per RE to which PDSCH is mapped.

As described above, if the PDSCH signal is transmitted based on the CRS, since the eNB should transmit the CRS to all RBs, unnecessary RS overhead is generated. To solve this problem, the 3GPP LTE-A system additionally defines UE-specific RS (hereinafter, UE-RS) and channel state information reference signal (CSI-RS) in addition to the CRS. The UE-RS is used for demodulation, and the CSI-RS is used to derive channel state information.

Since the UE-RS and the CRS are used for demodulation, they may be RSs for demodulation in view of use. That is, the UE-RS may be regarded as a kind of a demodulation reference signal (DM-RS). Also, since the CSI-RS and the CRS are used for channel measurement or channel estimation, they may be regarded as RSs for channel state measurement in view of use.

Figure 11:
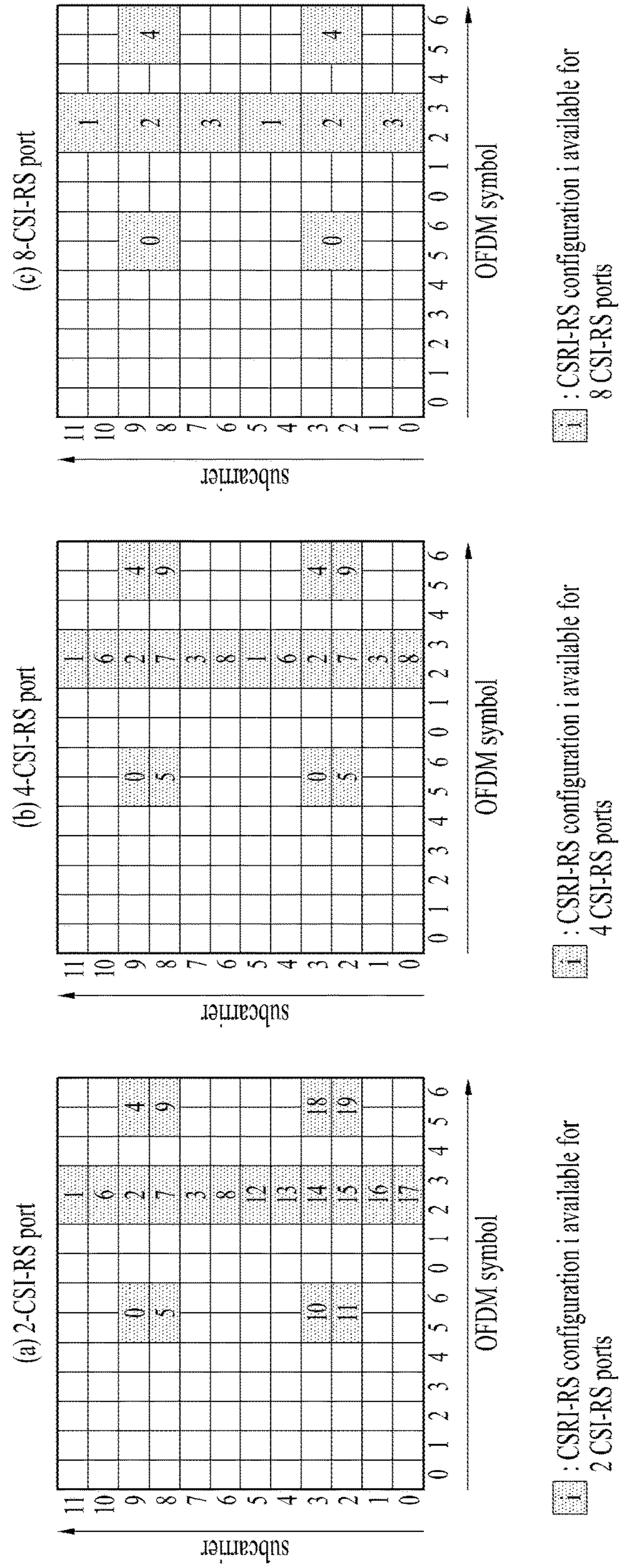
FIG. 11 illustrates an example that legacy PDCCH, PDSCH and E-PDCCH, which are used in an LTE/LTE-A system, are multiplexed.
Figure 12:
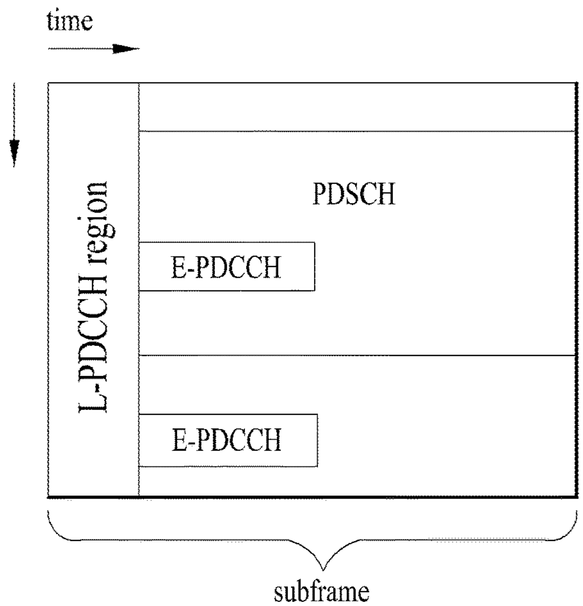
FIG. 12 illustrates an example of a CA environment supported by an LTE-U system.

FIG. 11 is a diagram for an example of subframes to which a CSI-RS capable of being used in the embodiments of the present invention is assigned according to the number of antennas.

A CSI-RS is a DL reference signal introduced to 3GPP LTE-A system not to perform demodulation but to measure a state of a radio channel. 3GPP LTE-A system defines a plurality of CSI-RS configurations for CSI-RS transmission. In subframes in which CSI-RS transmission is configured, a CSI-RS sequence is mapped according to complex modulation symbols which are used as reference symbols on an antenna port p.

FIG. 11(*a*) shows 20 CSI-RS configurations ranging from 0 to 19 capable of being used for transmitting a CSI-RS by 2 CSI-RS ports among CSI-RS configurations, FIG. 11(*b*) shows 10 CSI-RS configurations ranging from 0 to 9 capable of being used for transmitting a CSI-RS by 4 CSI-RS ports among the CSI-RS configurations, and FIG. 11(*c*) shows 5 CSI-RS configurations ranging from 0 to 4 capable of being used for transmitting a CSI-RS by 8 CSI-RS ports among the CSI-RS configurations.

In this case, a CSI-RS port may correspond to an antenna port which is configured for CSI-RS transmission. Since a CSI-RS configuration varies according to the number of CSI-RS ports, although CSI-RS configuration numbers are identical to each other, if the number of antenna ports configured for CSI-RS transmission is different, it can be considered as a different CSI-RS configuration.

Meanwhile, a CSI-RS is configured to be transmitted with a certain transmission period corresponding to a plurality of subframes unlike a CRS configured to be transmitted in every subframe. Hence, a CSI-RS configuration varies according to not only positions of REs occupied by a CSI-RS in an RB pair but also a subframe to which the CSI-RS is set.

Although CSI-RS configuration numbers are identical to each other, if a subframe for CSI-RS transmission is different, it can be considered as a different CSI-RS configuration. For example, if a CSI-RS transmission period ($T_{CSI-RS}$) is different if a start subframe ($\Delta_{CSI-RS}$) to which CSI-RS transmission is set is different in a radio frame, it can be considered as a different CSI-RS configuration.

In the following, in order to distinguish (1) a CSI-RS configuration to which a CSI-RS configuration number is assigned from (2) a CSI-RS configuration which varies according to a CSI-RS configuration number, the number of CSI-RS ports, and/or a subframe in which a CSI-RS is configured, the latter CSI-RS configuration (2) is referred to as a CSI-RS resource configuration. The former CSI-RS configuration (1) is referred to as a CSI-RS configuration or a CSI-RS pattern.

When an eNB informs a UE of the CSI-RS resource configuration, the eNB can inform the UE of information on the number of antennas used tin transmitting CSI-RSs, a CSI-RS pattern, a CSI-RS subframe configuration $I_{CSI-RS}$, UE assumption on reference PDSCH transmitted power for CSI feedback $P_c$, a zero power CSI-RS configuration list, a zero power CSI-RS subframe configuration, and the like.

The CSI-RS subframe configuration index $I_{CSI-RS}$ corresponds to information for specifying a subframe configuration period $T_{CSI-RS}$ and a subframe offset $\Delta_{CSI-RS}$ for the occurrence of CSI-RSs. [Table 6] in the following illustrates the CSI-RS subframe configuration index $I_{CSI-RS}$ according to the $T_{CSI-RS}$ and the $\Delta_{CSI-RS}$.

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |

TABLE 6-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 35-74 | 40 | $I_{CSI-RS}$ − 35 |
| 75-154 | 80 | $I_{CSI-RS}$ − 75 |

In this case, subframes satisfying equation 3 in the following become subframes including a CSI-RS.

$$(10n_f+\lfloor n_s/2\rfloor-\Delta_{CSI-RS}) \bmod T_{CSI-RS}=0 \quad \text{[Equation 3]}$$

A UE configured by a transmission mode defined in a system appearing after 3GPP LTE-A system (e.g., transmission mode 9 or a newly defined transmission mode) the UE performs channel measurement using a CSI-RS and may be able to decode PDSCH using a UE-RS.

A UE configured by a transmission mode defined in a system appearing after 3GPP LTE-A system (e.g., transmission mode 9 or a newly defined transmission mode) the UE performs channel measurement using a CSI-RS and may be able to decode PDSCH using a UE-RS.

2.5 Enhanced PDCCH (EPDCCH)

In the 3GPP LTE/LTE-A system, cross carrier scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 11 illustrates an example that legacy PDCCH, PDSCH and E-PDCCH, which are used in an LTE/LTE-A system, are multiplexed.

2.7 Restricted CSI Measurement

To mitigate the effect of interference between cells in a wireless network, network entities may cooperate with each other. For example, other cells except a cell A transmit only common control information without transmitting data during the duration of a specific subframe for which the cell A transmits data, whereby interference with a user receiving data in the cell A may be minimized.

In this way, interference between cells may be mitigated by transmitting only minimal common control information from other cells except a cell transmitting data at a specific time through cooperation between cells in a network.

For this purpose, if a higher layer configures two CSI measurement subframe sets CCSI,0 and CCSI,1, a UE may perform Resource-Restricted Measurement (RRM). At this time, it is assumed that CSI reference resources corresponding to the two measurement subframe sets belong to only one of the two subframe sets.

The following [Table 7] illustrates an example of a higher-layer signal that configures CSI subframe sets.

TABLE 7

```
CQI-ReportConfig-r10 ::= SEQUENCE {
        cqi-ReportAperiodic-r10                 CQI-ReportAperiodic-r10
        OPTIONAL,   -- Need ON
        nomPDSCH-RS-EPRE-Offset                 INTEGER (−1..6),
        cqi-ReportPeriodic-r10                  CQI-ReportPeriodic-r10
        OPTIONAL,   -- Need ON
        pmi-RI-Report-r9                        ENUMERATED {setup}
                OPTIONAL,   -- Cond PMIRIPCell
        csi-SubframePatternConfig-r10     CHOICE {
                release                                         NULL
                setup                                           SEQUENCE {
                        csi-MeasSubframeSet1-r10                MeasSubframePattern-
r10,
                        csi-MeasSubframeSet2-r10                MeasSubframePattern-
r10
                }
        }
                                                OPTIONAL    -- Need ON
}
```

[Table 7] illustrates an example of CQI report configuration (CQI-Report Config) message transmitted to configure CSI subframe sets. The CQI-Report configuration message may include an aperiodic CQI report cqi-ReportAperiodic-r10 Information Element (IE), a nomPDSCH-RS-EPRE-Offset IE, a periodic CQI report cqi-ReportPeriodic-r10 IE, a PMI-RI report pmi-RI-Report-r9 IE, and a CSI subframe pattern configuration csi-subframePatternConfig IE. At this time, the CSI subframe pattern configuration IE includes CSI measurement subframe set 1 information (csi-MeasSubframeSet1) IE and a CSI measurement subframe set 2 information (csi-MeasSubframeSet2) IE, which indicate measurement subframe patterns for the respective subframe sets.

In this case, each of the csi-MeasSubframeSet1-r10 IE and the csi-MeasSubframeSet2-r10 IE is 40-bit bitmap information representing information on subframes belonging to each subframe set. Also, aperiodic report CQI-ReportAperiodic-r10 IE is used to configure an aperiodic CQI report for the UE, and the periodic CQI report CQI-ReportPeriodic-r10 is used to configure a periodic CQI report for the UE.

The nomPDSCH-RS-EPRE-Offset IE indicates a value of $\Delta_{offset}$. At this time, an actual value is set to $\Delta_{offset}$ value*2 [dB]. Also, the PMI-RI report IE indicates configuration or non-configuration of a PMI/RI report. Only when a transmission mode is set to TM8, TM9, or TM10, the E-UTRAN configures the PMI-RI Report IE.

3. LTE-U System 3.1 LTE-U System Configuration

Hereinafter, methods for transmitting and receiving data in a carrier aggregation environment of an LTE-A band corresponding to a licensed band and an unlicensed band will be described. In the embodiments of the present invention, an LTE-U system means an LTE system that supports such a CA status of a licensed band and an unlicensed band. A WiFi band or Bluetooth (BT) band may be used as the unlicensed band.

Figure 13:
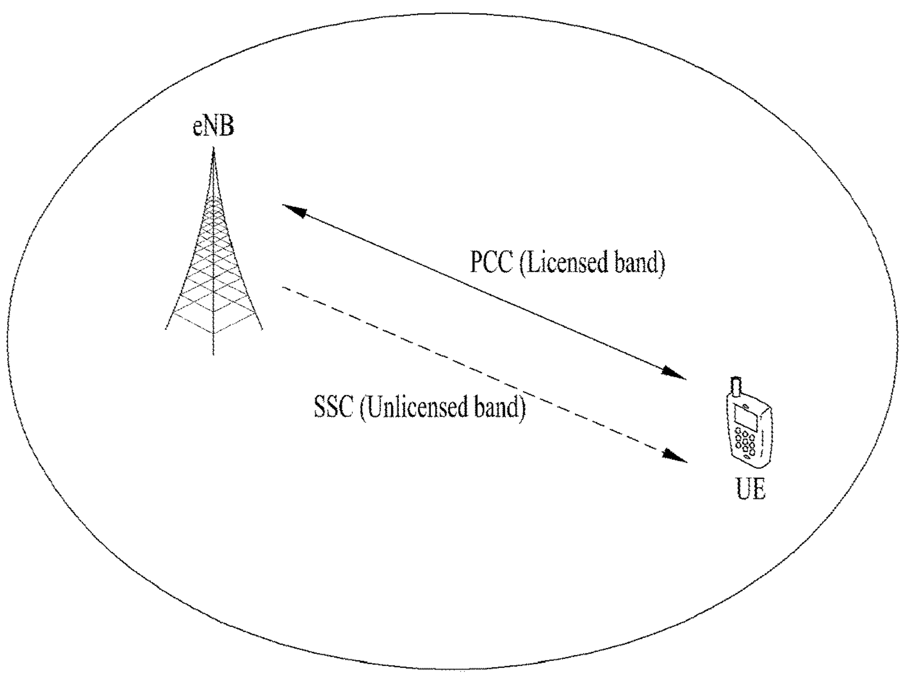
FIG. 13 illustrates one of methods for configuring TxOP duration.

FIG. 13 illustrates an example of a CA environment supported in an LTE-U system.

Hereinafter, for convenience of description, it is assumed that a UE is configured to perform wireless communication in each of a licensed band and an unlicensed band by using two component carriers (CCs). The methods which will be described hereinafter may be applied to even a case where three or more CCs are configured for a UE.

In the embodiments of the present invention, it is assumed that a carrier of the licensed band may be a primary CC (PCC or Pcell), and a carrier of the unlicensed band may be a secondary CC (SCC or Scell). However, the embodiments of the present invention may be applied to even a case where a plurality of licensed bands and a plurality of unlicensed bands are used in a carrier aggregation method. Also, the methods suggested in the present invention may be applied to even a 3GPP LTE system and another system.

In FIG. 13, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 13 is only example, and the embodiments of the present invention may be applied to even a CA environment that one UE accesses a plurality of eNBs.

For example, the UE may configure a macro eNB (M-eNB) and a Pcell, and may configure a small eNB (S-eNB) and an Scell. At this time, the macro eNB and the small eNB may be connected with each other through a backhaul network.

In the embodiments of the present invention, the unlicensed band may be operated in a contention-based random access method. At this time, the eNB that supports the unlicensed band may perform a carrier sensing (CS) procedure prior to data transmission and reception. The CS procedure determines whether a corresponding band is reserved by another entity.

For example, the eNB of the Scell checks whether a current channel is busy or idle. If it is determined that the corresponding hand is idle state, the eNB may transmit a scheduling grant to the UE to allocate a resource through (E)PDCCH of the Pcell in case of a cross carrier scheduling mode and through PDCCH of the Scell in case of a self scheduling mode, and may try data transmission and reception.

The CS procedure can be performed in a manner of being identical or similar to an LBT (Listen Before Talk) procedure. The LBT procedure corresponds to a procedure of an eNB of a Pcell performed to check whether a current state of an Ucell (cell operating on an unlicensed band) is busy or idle. For example, when there is a CCA (Clear Channel Assessment) threshold configured by a predetermined signal or a higher layer signal, if energy higher than the CCA threshold is detected in the UCell, it is determined as the UCell is in a busy state. Otherwise, it is determined as the UCell is in an idle state. If the UCell is in the idle state, the eNB of the Pcell transmits a scheduling grant (i.e., DCI) to the UCell via (E)PDCCH of the Pcell or PDCCH of the UCell to schedule a resource of the and perform data transmission and reception via the UCell.

At this time, the eNB and/or a TP may configure a transmission opportunity (TxOP) duration comprised of M consecutive subframes. In this case, a value of M and a use of the M subframes may previously be notified from the eNB to the UE through higher layer signaling through the Pcell or through a physical control channel or physical data channel. The TxOP duration comprised of M subframes can also be called an RRP (Reserved Resource Period).

3.2 TxOP Duration

An eNB may transmit and receive data to and from one UE for a TxOP duration, and may configure a TxOP duration comprised of N consecutive subframes for each of a plurality of UEs and transmit and receive data in accordance with TDM or FDM. At this time, the eNB may transmit and receive data through a Pcell which is a licensed band and an Scell which is an unlicensed band for the TxOP duration.

However, if the eNB transmits data in accordance with a subframe boundary of an LTE-A system corresponding to a licensed band, a timing gap may exist between an idle determination timing of the Scell which is an unlicensed band and an actual data transmission timing. Particularly, since the Scell should be used as an unlicensed band, which cannot be used exclusively by a corresponding eNB and a corresponding UE, through CS based contention, another system may try information transmission for the timing gap.

Therefore, the eNB may transmit a reservation signal from the Scell to prevent another system from trying information transmission for the timing gap. In this case, the reservation signal means a kind of “dummy information” or “a copy of a part of PDSCH” transmitted to reserve a corresponding resource region of the Scell as a resource of the eNB. The reservation signal may be transmitted for the timing gap (i.e., from the idle determination timing of the Scell to the actual transmission timing).

3.3 TxOP Duration Configuration Method

Figure 14:
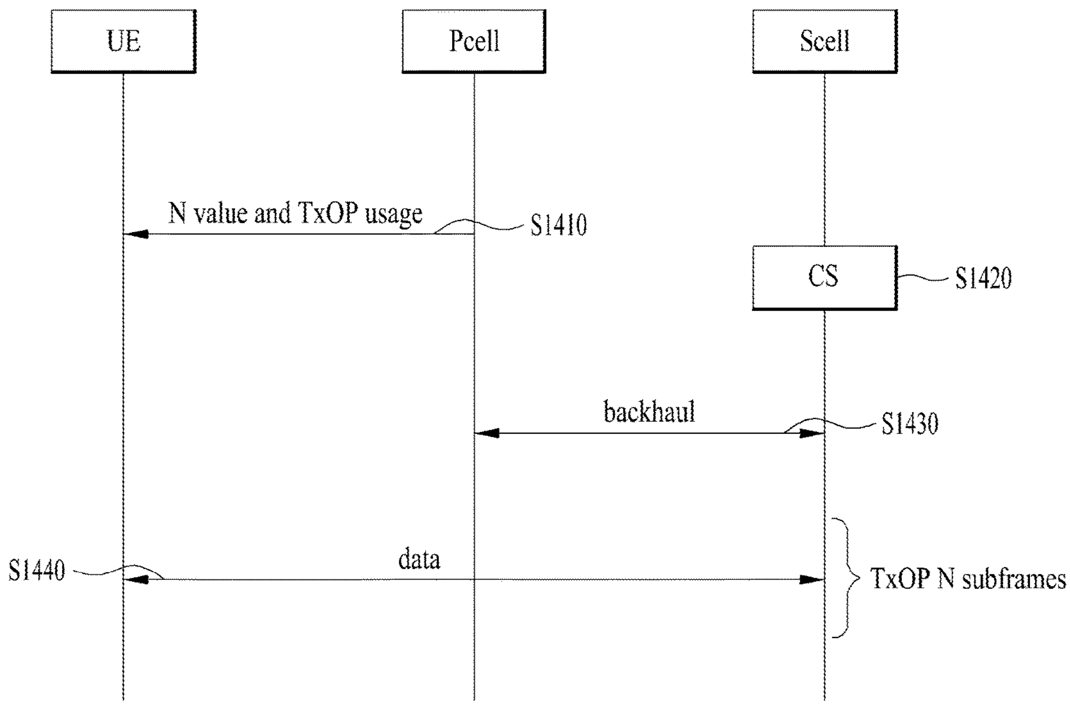
FIG. 14 illustrates one of methods for configuring TxOP duration.

FIG. 14 illustrates one of methods for configuring TxOP duration.

An eNB can semi-statically configure a TxOP duration in advance via a Pcell. For example, the eNB can transmit configuration information on a value of N number of subframes constructing the TxOP duration and a usage of the TxOP duration to a UE via a higher layer signal (e.g., RRC signal) [S1410].

Yet, the step S1410 can be dynamically performed according to a system configuration. In this case, the eNb can transmit the configuration information on the TxOP duration to the UE via PDCCH or E-PDCCH.

An Scell performs carrier sensing (CS) to check whether a current channel state is idle or busy [S1420].

The Pcell and the Scell can be managed by a different eNB or the same eNB. If the Pcell and the Scell are managed by a different eNB, information on a channel state of the Scell can be forwarded to the Pcell via a backhaul [S1430].

Subsequently, the UE can transmit and receive data via the Pcell and the Scell in subframes configured as the TxOP duration. In the step S1410, if the usage of the TxOP duration is configured for DL data transmission, the UE can receive DL data via the Scell in the TxOP duration. If the usage of the TxOP is configured for UL data transmission, the UE can transmit UL data via the Scell in the TxOP duration [S1440].

4. LBT Operation

An LBT operation corresponds to a series of processes performed by an eNB to initiate data transmission and reception in TxOP duration after CS is performed on an unlicensed band. In the following, a method of performing backoff, a method of transmitting a reservation signal, and a method of configuring TxOP performed during the LBT operation are explained.

4.1 Method of Performing Backoff

According to a WiFi system operating on an unlicensed band, when data transmission is initiated or a channel state is busy, each STA (station) always measures as channel state for DIFS (DCI inter-frame space, e.g., 34 us) and starts backoff only when the channel state is idle. The backoff is performed to guarantee an SIFS (short inter-frame space, e.g., 16 us) between data transmission and ACK signal transmission or a PIFS (PCF inter-frame space, e.g., 25 us) before an AP (access point) configures a contention free period.

An LAA system coexisted with the WiFi system on the unlicensed band is also necessary to have an LBT operation to guarantee the aforementioned time. In this case, a minimum unit for determining whether a radio channel is busy or idle is defined as 1 CS unit in the LAA system. 1 CS unit is configured by X us (e.g., 9 us) and an eNB performs CS one time during the 1 CS unit. When an LAA eNB performs CS, the LAA eNB can be configured to transmit data only when a channel is continuously idle during minimum Y CS units (e.g., Y=4) immediately before actual data or a reservation signal is transmitted. In this case, it may be able to configure such a condition as X*Y>=Z (e.g., Z=25 us) to be satisfied. In this case, the Z may correspond to time configured to measure a channel state (e.g., busy or idle) in a system (e.g., WiFi) operating on an unlicensed band. For example, the Z can be configured by time for guaranteeing SIFS, PIFS, ACK, etc. or time of a unit corresponding to DIFS (i.e., 34 us).

Figure 15:
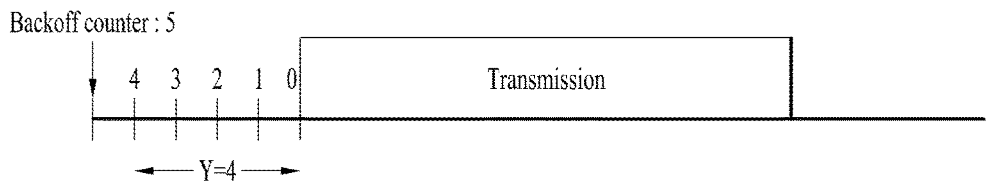
FIG. 15 is a diagram for explaining one of methods for performing backoff.
Figure 15:
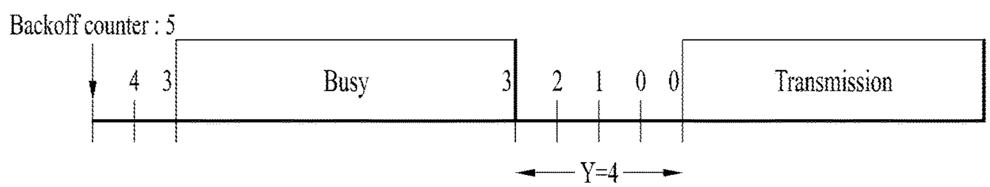

FIG. 15 is a diagram for explaining one of methods for performing backoff.

In FIG. 15, assume a case that an eNB selects a random integer from among integers ranging from 0 to 15, configures the selected random integer as a backoff counter value N, reduces the backoff counter value only when a channel is idle after CS is performed, and transmits data or a reservation signal when the backoff counter value becomes ‘0’. And, assume a case that an idle state minimum guarantee time Y corresponds to 4 CS units.

Referring to FIG. 15(*a*), since an eNB selects 5 as a backoff counter value and a channel is continuously idle during 5 CS units, the minimum guarantee time Y is satisfied. Hence, the eNB can immediately start data transmission and reception when the backoff counter value becomes ‘0’.

On the contrary, referring to FIG. 15(*b*), if the eNB selects 3 as the backoff count value and starts CS, although the backoff counter value becomes 0, since an idle state is checked during 3 CS units only, the minimum guarantee time Y is not satisfied. Hence, the eNB additionally performs CS for 1 CS unit and may start data transmission only when a channel is idle during 4 continuous CS units.

For example, assume a case that a backoff counter value newly selected by the eNB for a next TxOP or a backoff counter value immediately after a busy section ends corresponds to N and idle state minimum guarantee time corresponds to Y. If N≥Y, the eNB can immediately transmit data or a reservation signal when the backoff counter value becomes 0. However, if N≤Y, the eNB further performs CS as many as Y−N times and may be able to transmit data or a reservation signal when a corresponding channel is in an idle state.

As a different method, a size 'X' of 1 CS unit can be configured by time longer than 'Z' in a system. In this case, if a channel state is idle for 1 CS unit only, it may be able to guarantee SIFS or PIFS time of WiFi system. As a result, an eNB can transmit data or a reservation signal whenever a backoff counter value becomes 0.

Figure 16:
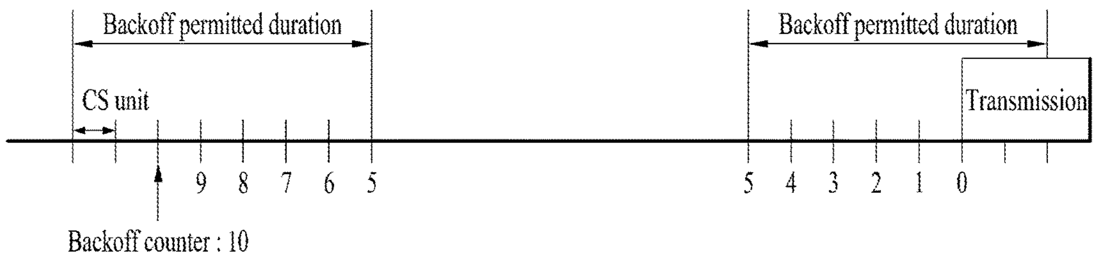
FIG. 16 is a diagram for explaining another one of methods for performing backoff.
Figure 16:
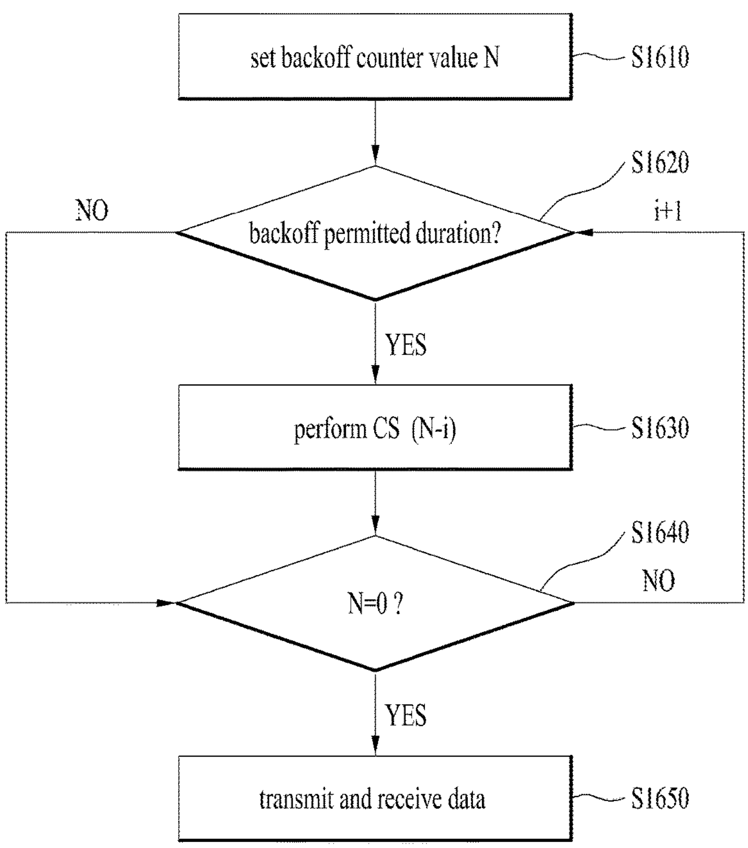

FIG. 16 is a diagram for explaining another one of methods for performing backoff.

In the following, a method of performing backoff only in duration capable of performing CS when there is a limit on a time resource in which CS is performed.

When TxOP duration or a subframe of an UCell is configured in accordance with a subframe boundary of a Pcell, if a channel state becomes idle or a backoff counter value becomes 0 immediately after the subframe boundary, an eNB can transmit a reservation signal.

In this case, if the reservation signal simply corresponds to a dummy signal, although a channel is occupied for time close to 1 ms, it is unable to transmit data and other nodes of an unlicensed band are interfered by the reservation si gated, thereby deteriorating the entire system performance. In order to solve the problem, as shown in FIG. 16, it may be able to set a limit on a CS permitted duration. In the following, the CS permitted duration is called a backoff permitted duration.

The backoff permitted duration can be configured by T us immediately before a subframe boundary, T us immediately after the subframe boundary, or time configured irrespective of the subframe boundary. If a backoff permitted duration to which CS is permitted is configured, an eNB performs CS in the duration only and can decrease a backoff counter value.

Referring to FIG. 16(*a*), although a channel is idle between first backoff permitted duration and second backoff permitted duration, an eNB does not perform CS and does not decrease a backoff count value. The eNB performs CS in backoff permitted duration only to check whether a channel state. If the channel state is idle, the eNB can reduce the backoff counter value.

FIG. 16(*b*) is a flowchart for explaining an operation of an eNB that performs CS in backoff permitted duration. Referring to FIG. 16(*b*), if it is necessary for the eNB to transmit and receive data via an unlicensed band, the eNB performs an operation for determining whether or not the unlicensed band is in an idle state. To this end, the eNB configures a backoff counter value N [S1610].

In this case, the backoff counter value N may correspond to a value dynamically configured by the eNB according to a channel state or a value configured by a fixed value in a system.

The eNB determines whether or not current TTI corresponds to backoff permitted duration [S1620].

If the current TTI corresponds to the backoff permitted duration, the eNB performs CS. Otherwise, the eNB does not perform CS. If the unlicensed band is an idle state, the backoff counter value N is decreased as much as 1. If the unlicensed band is not in the idle state, the backoff counter value N is maintained. As a different method, it may be able to define an idle state confirmation count i (i is a positive integer). The eNB performs CS to check a state of a channel. If the channel is in an idle state, the eNB increase the i by 1. If the channel is not in the idle state, the eNB can maintain the i [S1630].

After the step S1630 is performed, the eNB checks whether or not the backoff counter N value arrives at 0 [S1640].

If the N corresponds to 0, the eNB transmits and receives data by initiating TxOP duration or transmits a reservation signal to guarantee the TxOP duration [S1650].

If the N is not 0 in the step S1640, the eNB returns to the step S1620, determines whether or not the current corresponds to backoff permitted duration, and repeats the steps S1630 and S1640.

4.2 Backoff Slot and OFDM Symbol Boundary

It may be able to permit data transmission to be initiated not only at a subframe boundary of an UCell but also at an OFDM symbol boundary on an unlicensed band. In this case, it may be preferable to configure TTI in a manner of matching the backoff slot boundary with the OFDM symbol boundary.

In case of an OFDM symbol using a normal CP, due to a structure of an LTE subframe, a first OFDM symbol of each slot is configured by (160+2048) Ts and the remaining OFDM symbols are configured by (144+2048) Ts. In this case, 1 Ts corresponds to 1/(2048*15 k)s.

If a length of a backoff slot (or CS unit) is fixed, since a length of an OFDM symbol in the slot or a unit varies and a difference (about 0.5 us) of the length is very small, it is difficult to find out a CS unit capable of well matching a backoff slot boundary and an OFDM symbol boundary with each other.

Figure 17:
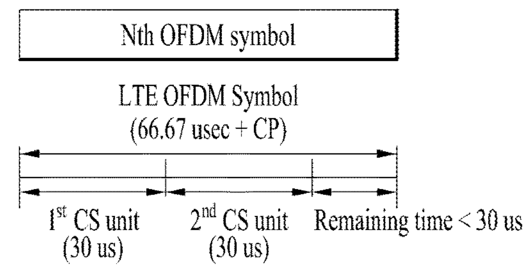
FIG. 17 is a diagram for explaining a boundary between a CS unit and an OFDM symbol.

FIG. 17 is a diagram for explaining a boundary between a CS unit and an OFDM symbol.

As shown in FIG. 17, if backoff is configured to be performed in a CS unit, a time unit smaller than the CS unit can be remained immediately before an OFDM symbol boundary. A size of the CS unit can be determined according to a configuration of the remaining time.

Referring to FIG. 17, a size of a single OFDM symbol (i.e., $N^{th}$ symbol) corresponds to 66.67 usec+CP length. In this case, if a size of a CS unit is assumed as 30 us, remaining time may have a size smaller than 30 us. In the following, methods of processing the remaining time are explained.

As a first method, it may be able to configure an eNB not to perform CS during the remaining time. If a backoff counter value corresponds to 0 in a second CS unit, CS is not performed during the remaining time and a reservation signal or data can be transmitted from a next OFDM symbol boundary (i.e., N+1 OFDM symbol).

As a second method, if the remaining time is longer than time necessary for CS and Rx/Tx switching, it may be able to configure the eNB to perform a CS process identical to a legacy CS unit.

As a third method, the eNB can redefine a second CS unit of FIG. 17 and the remaining time as a single CS unit. In particular, the last CS unit immediately before an OFDM symbol boundary can be defined by a length longer than a legacy CS unit in a manner of being combined with the remaining time. In this case, since a channel state is changed during the remaining time compared to the operation operated according to the first method, it may be able to reduce interference that affects a different node.

Figure 18:
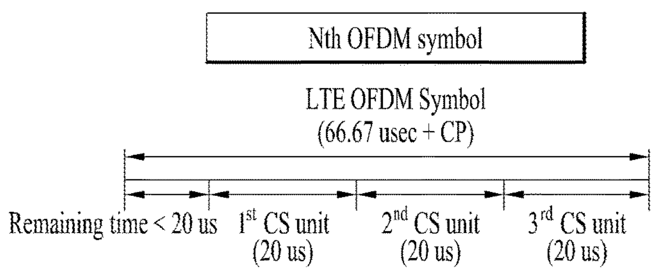
FIG. 18 is a different diagram for explaining a boundary between a CS unit and an OFDM symbol.

As a fourth method, a first CS unit is newly defined by the sum of a legacy CS unit and the remaining time and the remaining CS units can be configured to maintain a size of the legacy CS unit. FIG. 18 is a different diagram for explaining a boundary between a CS unit and an OFDM symbol. In particular, FIG. 18 shows a case that a first CS unit is configured by combining an original size of a CS unit with the remaining time.

As a fifth method, in FIG. 18, the remaining time is configured to be positioned prior to a first CS unit and it is able to configure the eNB not to perform CS in the remaining time. In particular, the eNB does not perform CS during the remaining time and may be able to perform CS in the remaining CS units only.

The fourth and the fifth methods have a merit in that a length of a reservation signal is constantly maintained when the eNB transmits the reservation signal during fractional OFDM at the time that a point at which a CS operation ends corresponds to a median point of OFDM symbol of a licensed band. In particular, a length of a reservation signal smaller than one OFDM symbol can be configured by a multiple of a CS unit. In FIG. 18, if a length of a reservation signal is configured by 20 us, 40 us, or a length of 1 OFDM symbol, it may be able to more simply implement the reservation signal.

As a different aspect of the present embodiment, a CS unit can be configured by a size of an OFDM symbol unit or a size of 1/n (n is a natural number) of an OFDM symbol.

For example, if a corresponds to 2, a CS unit can be configured by (160+2048)/2 Ts in first and eighth OFDM symbols of LTE subframe using a normal CP and a CS unit can be configured by (144+2048)/2 Ts in the remaining OFDM symbols.

In the embodiments of the present invention, a CS unit can be configured in consideration of carrier sensing time, Rx/Tx switching time, and the like. For example, if the CS time corresponds to 4 us and the Rx/Tx switching time corresponds to 20 us, it is preferable to configure the CS unit by time longer than at least 24 us.

An operation of matching the aforementioned backoff slot boundary with a boundary of specific TTI predefined in LTE system can be easily applied not only to an OFDM symbol boundary, but also to a subframe boundary.

4.3 TxOP Duration Configuration Method

In the following, a method of configuring TxOP duration in proportion to a length of a reservation signal is explained.

Figure 19:
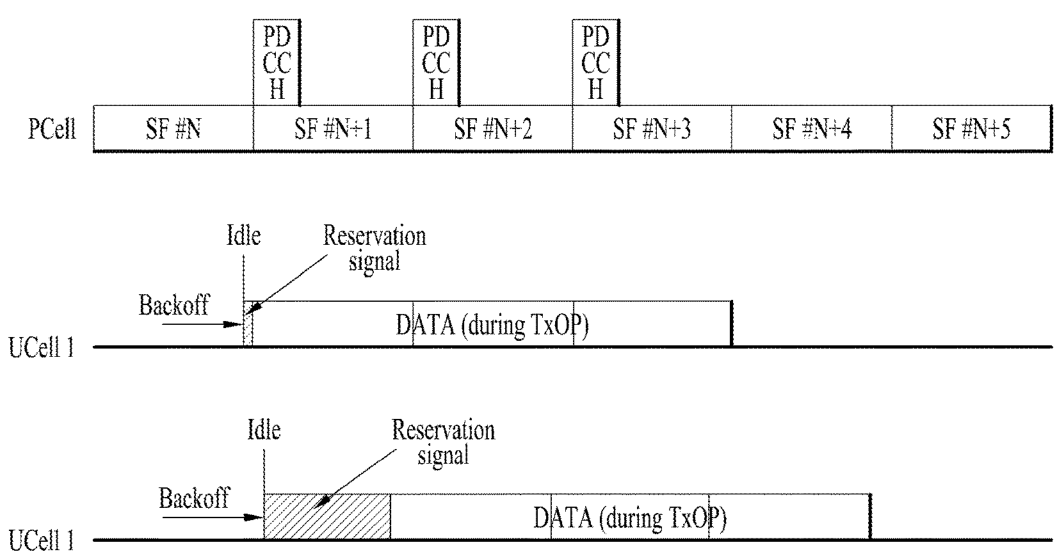
FIG. 19 illustrates one of methods for configuring TxOP duration.

FIG. 19 illustrates one of methods for configuring TxOP duration.

As mentioned in the foregoing description, in order to occupy a channel, an eNB can transmit a reservation signal during a timing gap existing between timing at which an idle state of a UCell is determined and timing at which actual data is transmitted and received. In this case, assume that a subframe of the UCell is transmitted in accordance with a subframe boundary of a Pcell and transmission opportunity duration (TxOP) is configured by 3 subframes (SFs).

Referring to FIG. 19, the eNB transmits a reservation signal immediately before an SF #N+1 boundary of the Pcell in a UCell 1 and transmits a reservation signal immediately after the SF #N+1 of the Pcell in a Ucell 2. The Ucell 1 has almost no overhead of the reservation signal. On the contrary, the Ucell 2 has overhead of the reservation signal significantly bigger than the TxOP duration (about 25%). In particular, since the overhead for transmitting the reservation signal in the Ucell 2 is considerably bigger than that of the UCell 1, resource efficiently is considerably low.

In the following, a method of configuring a length of TxOP duration in proportion to a length of a reservation signal and a method of configuring as length of a reservation signal in proportional to TxOP duration are proposed to maintain overhead of the reservation signal with a certain level.

For example, if a reservation signal is transmitted during a period shorter than 0.5 ms, TxOP duration is configured by 3 ms. If a reservation signal is transmitted during a period longer than 0.5 ms, the TxOP duration can be configured by 6 ms.

In general, if there are K number of timings at which a reservation signal is transmitted during 1 subframe (e.g., 1 ms) of UCell, a length of a reservation signal transmitted by an eNB can be configured by (1 ms/K)*k, (k=1,2, . . . , K). For example, assume a case that there are 5 (K=5) CS units during SF and a reservation signal is transmitted at the timing where a backoff counter becomes '0'. In this case, if transmission of a reservation signal starts at a second CS unit, the eNB can transmit the reservation signal during (5−2)/5 ms (=0.6 ms).

If the eNB transmits a reservation signal during k/Kms (k=1, 2, . . . K), the eNB may transmit and receive data by configuring TxOP during ceiling (k*U) time. Or, the eNB may configure TxOP duration during minimum ceiling (k*U) time. For example, if the U corresponds to 1.5 ms and the k corresponds to 3, TxOP can be configured during 5 subframes (i.e., 5 ms). If maximum TxOP duration, which is restricted by regulation of an unlicensed band on which LAA is operating, corresponds to R ms, TxOP duration can be configured by min{ceiling(k*U),R}.

5. Implementation Apparatus

Figure 20:
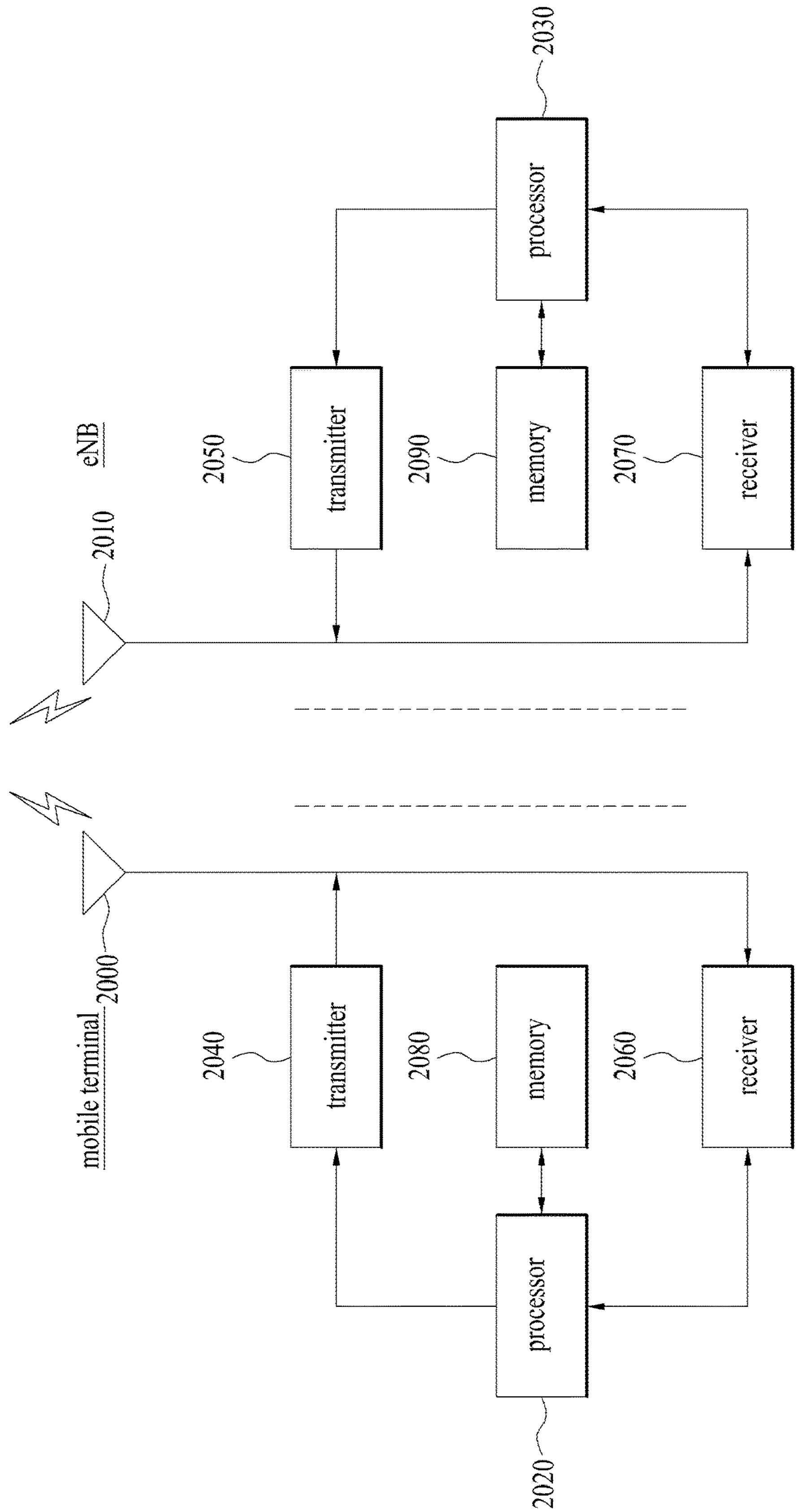
FIG. 20 is a diagram for a means capable of implementing the methods mentioned in FIGS. 1 to 19.

FIG. 20 is a diagram for a means capable of implementing the methods mentioned earlier in FIGS. 1 to 19.

A user equipment (UE) operates as a transmitting end in UL and operates as a receiving end in DL. And, an e-Node B (eNB) operates as a receiving end in UL and operates as a transmitting end in DL.

In particular, the UE and the eNB can include a transmitter 2040/2050 and a receiver 2050/2070 to control transmission and reception of information, data, and/or a message and antennas 2000/2010 to transmit and receive information, data, and/or a message.

The UE and the eNB can respectively include a processor 2020/2030 for performing the aforementioned embodiments of the present invention and a memory 2080/2090 capable of temporarily or consistently storing a process of the processor.

The embodiments of the present invention can be performed using configuration components and functions of the UE and the eNB. For example, the processor of the eNB configures a backoff counter value and determines whether or not each TTI (or SF) corresponds to backoff permitted duration. If TTI corresponds to backoff permitted duration, the processor of the eNB controls the transmitter and/or the receiver to perform CS. After the CS is performed, the backoff counter value can be decreased by 1. Subsequently, if the backoff counter becomes 0, the processor of the eNB can transceive a reservation signal and/or data with the UE via the UCell.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 20 may further include a low-power Radio Frequency (RF)/Intermediate Frequency (IF)module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smartphone, a Multi Mode-Multi Band (MM-MB) terminal, etc.

The smartphone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 2080 or 2090 and executed by the processor 2020 or 2030. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention are applicable to various wireless access systems including a 3GPP system, a 3GPP2 system, and/or an IEEE 802.xx system. Besides these wireless access systems, the embodiments of the present invention, are applicable to all technical fields in which the wireless access systems find their applications.

What is claimed is:

1. A method of performing a backoff operation in a wireless access system supporting an unlicensed band, the method comprising:

configuring a backoff counter value for performing the backoff operation;

when a current subframe corresponds to a backoff permitted duration, decreasing the backoff counter value by 1 based on whether the unlicensed band is in an idle state or not after performing a carrier sensing (CS) operation in a CS unit;

when the current subframe does not correspond to the backoff permitted duration, maintaining the backoff counter value without performing the CS operation; and transmitting a reservation signal or data via a cell configured on the unlicensed band when the backoff counter value is zero.

2. The method of claim 1, wherein the backoff counter value corresponds to a fixed value configured in the wireless access system or a value dynamically or semi-statically configured via a cell configured on a licensed band.

3. The method of claim 1, wherein a boundary of the CS unit at which the CS operation is performed is configured to be matched with a boundary of an Orthogonal Frequency Division Multiple (OFDM) symbol of a cell configured on a licensed band.

4. The method of claim 3, wherein if there is remaining time duration due to a size of the CS unit smaller than a size of the OFDM symbol, the CS operation is configured not to be performed during the remaining time duration.

5. The method of claim 3, wherein if there is remaining time duration due to a size of the CS unit smaller than a size of the OFDM symbol, the remaining time duration is configured from a start boundary of the OFDM symbol and the CS operation is configured not to be performed during the remaining time duration.

6. The method of claim 1, wherein a length of transmission opportunity duration (TxOP) for transmitting the data is configured in proportion to a length of the reservation signal.

7. An eNode-B (eNB) for performing a backoff operation in a wireless access system supporting an unlicensed band, the eNB comprising:

a transmitter;

a receiver; and a processor configured to:

control the transmitter and the receiver to perform the backoff operation, set a backoff counter value for performing the backoff operation, when a current subframe corresponds to a backoff permitted duration, decrease the backoff counter value by 1 based on whether the unlicensed band is in an idle state or not after performing a carrier sensing (CS) operation in a CS unit, when the current subframe does not correspond to the backoff permitted duration, maintain the backoff counter value without performing the CS operation, and control the transmitter to transmit a reservation signal or data via a cell configured on the unlicensed band when the backoff counter value is zero.

8. The eNB of claim 7, wherein the backoff counter value corresponds to a fixed value configured in the wireless access system or a value dynamically or semi-statically configured via a cell configured on a licensed band.

9. The eNB of claim 7, wherein a boundary of the CS unit at which the CS operation is performed is configured to be matched with a boundary of an Orthogonal Frequency Division Multiple (OFDM) symbol of a cell configured on a licensed band.

10. The eNB of claim 9, wherein if there is remaining time duration due to a size of the CS unit smaller than a size of the OFDM symbol, the CS operation is configured not to be performed during the remaining time duration.

11. The eNB of claim 9, wherein if there is remaining time duration due to a size of the CS unit smaller than a size of the OFDM symbol, the remaining time duration is configured from a start boundary of the OFDM symbol and the CS operation is configured not to be performed during the remaining time duration.

12. The eNB of claim 7, wherein a length of transmission opportunity duration (TxOP) for transmitting the data is configured in proportion to a length of the reservation signal.

* * * * *